United States Patent
Kalyanasundharam et al.

(10) Patent No.: US 10,684,965 B2
(45) Date of Patent: Jun. 16, 2020

(54) METHOD TO REDUCE WRITE RESPONSES TO IMPROVE BANDWIDTH AND EFFICIENCY

(71) Applicant: Advanced Micro Devices, Inc., Sunnyvale, CA (US)

(72) Inventors: Vydhyanathan Kalyanasundharam, San Jose, CA (US); Amit P. Apte, Austin, TX (US); Chen-Ping Yang, Fremont, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/807,151

(22) Filed: Nov. 8, 2017

(65) Prior Publication Data

US 2019/0138465 A1   May 9, 2019

(51) Int. Cl.
*G06F 13/16* (2006.01)
*G06F 13/30* (2006.01)
*G06F 13/42* (2006.01)

(52) U.S. Cl.
CPC ...... *G06F 13/1642* (2013.01); *G06F 13/1689* (2013.01); *G06F 13/30* (2013.01); *G06F 13/4234* (2013.01)

(58) Field of Classification Search
CPC .............................. G06F 12/0246; G06F 3/061
USPC ............................... 711/103; 714/42; 710/22
See application file for complete search history.

(56) References Cited

U.S. PATENT DOCUMENTS

| | | |
|---|---|---|
| 4,495,569 A | 1/1985 | Kagawa |
| 4,862,354 A | 8/1989 | Fiacconi et al. |
| 4,967,342 A | 10/1990 | Lent et al. |
| 5,125,093 A | 6/1992 | McFarland |
| 5,218,703 A | 6/1993 | Fleck et al. |
| 5,283,904 A | 2/1994 | Carson et al. |
| 5,781,187 A | 7/1998 | Gephardt et al. |

(Continued)

FOREIGN PATENT DOCUMENTS

WO   9408313 A1   4/1994

OTHER PUBLICATIONS

Lawley, Jason, "Understanding Performance of PCI Express Systems", White Paper: UltraScale and Virtex-7 FPGAs, Oct. 28, 2014, 16 pages, v1.2, Xilinx, https://www.xilinx.com/support/documentation/white_papers/wp350.pdf. [Retrieved Oct. 22, 2018].

*Primary Examiner* — Faisal M Zaman

(74) *Attorney, Agent, or Firm* — Kowert Hood Munyon Rankin and Goetzel PC; Rory D. Rankin

(57) ABSTRACT

Systems, apparatuses, and methods for routing traffic between clients and system memory are disclosed. A computing system includes system memory and one or more clients, each capable of generating memory access requests. The computing system also includes a communication fabric for transferring traffic between the clients and the system memory. The fabric includes master units for interfacing with clients and grouping write requests with a same target together. The fabric also includes slave units for interfacing with memory controllers and for sending a single write response when each write request in a group has been serviced. When the master unit receives the single write response for the group, it sends a respective acknowledgment response for each of the multiple write requests in the group to clients that generated the multiple write requests.

20 Claims, 6 Drawing Sheets

(56) References Cited

U.S. PATENT DOCUMENTS

| | | | |
|---|---|---|---|
| 5,881,303 A | 3/1999 | Hagersten et al. | |
| 5,897,657 A | 4/1999 | Hagersten et al. | |
| 6,389,526 B1 | 5/2002 | Keller et al. | |
| 6,393,529 B1 | 5/2002 | Keller | |
| 6,735,662 B1* | 5/2004 | Connor | G06F 13/102 370/473 |
| 7,440,419 B2 | 10/2008 | Arora et al. | |
| 2003/0200383 A1* | 10/2003 | Chui | G06F 13/4217 711/112 |
| 2005/0213607 A1* | 9/2005 | Cashman | H04L 67/14 370/467 |
| 2006/0179183 A1* | 8/2006 | Brittain | G06F 13/161 710/35 |
| 2006/0235999 A1* | 10/2006 | Shah | G06F 13/28 710/1 |
| 2008/0089361 A1* | 4/2008 | Metcalf | H04L 12/403 370/474 |
| 2010/0064070 A1* | 3/2010 | Yoshimura | G06F 13/128 710/22 |
| 2010/0183024 A1* | 7/2010 | Gupta | H04L 1/0072 370/463 |
| 2011/0153884 A1* | 6/2011 | Shimotaya | G06F 3/0611 710/106 |
| 2011/0246686 A1* | 10/2011 | Cavanagh, Jr. | G06F 13/28 710/22 |
| 2012/0030408 A1* | 2/2012 | Flynn | G06F 12/0246 711/102 |
| 2012/0072609 A1* | 3/2012 | Rajamani | H04N 21/4122 709/231 |
| 2013/0036339 A1* | 2/2013 | Shiraishi | G06F 12/04 714/763 |
| 2013/0185329 A1* | 7/2013 | Bartolome Rodrigo | G06F 17/30545 707/770 |
| 2014/0143454 A1* | 5/2014 | Hayut | G06F 3/016 710/19 |
| 2014/0310471 A1* | 10/2014 | Hollaway, Jr. | G06F 12/0811 711/128 |
| 2014/0313996 A1* | 10/2014 | Suga | H04W 56/0045 370/329 |
| 2015/0296528 A1* | 10/2015 | Coffey | H04L 1/0021 370/338 |
| 2016/0085706 A1* | 3/2016 | Deshpande | G06F 13/4022 710/317 |
| 2016/0179404 A1* | 6/2016 | Nanduri | G06F 3/061 711/103 |
| 2016/0188208 A1* | 6/2016 | Kim | G06F 3/061 711/103 |
| 2016/0188500 A1* | 6/2016 | Morris | G06F 13/1673 711/154 |
| 2016/0283157 A1* | 9/2016 | Kanai | G06F 3/0679 |
| 2017/0019231 A1* | 1/2017 | Mammoser | H04L 5/0055 |
| 2018/0217926 A1* | 8/2018 | Ogawa | G06F 3/061 |
| 2018/0239535 A1* | 8/2018 | Wilkinson | G06F 3/065 |

\* cited by examiner

US 10,684,965 B2

METHOD TO REDUCE WRITE RESPONSES TO IMPROVE BANDWIDTH AND EFFICIENCY

BACKGROUND

Description of the Related Art

Direct memory access (DMA) engines perform memory accesses of system memory without intervention from the central processing unit (CPU), the graphics processing unit (GPU), or other main processor of the computing system. For example, the GPU is the main processor in a video graphics processing card, and the GPU conveys memory access operations for the system memory to the DMA engine and returns to performing other tasks with multiple, parallel data. The memory access operations include read operations, write operations, memory-to-memory copy operations, and so forth. The DMA engine performs the received memory access operations and later conveys an indication to the GPU specifying the memory access operations are completed.

Some computing systems utilize multiple DMA engines. In addition, the computing systems may have multiple clients generated memory access operations such as other processors, input/output (I/O) peripheral devices and so forth. Typically, the data path between the DMA engine(s) and the system memory is bidirectional. In various computing systems, the available data bandwidth for the system memory is relatively high. However, the achieved bandwidth may become limited due to the lower response command bandwidth. Therefore, when techniques are used to saturate the available bandwidth for accessing system memory, the overall bandwidth is still limited since these techniques do not handle any inefficiencies in the response command bandwidth.

In view of the above, efficient methods and systems for routing traffic between clients and system memory are desired.

BRIEF DESCRIPTION OF THE DRAWINGS

The advantages of the methods and mechanisms described herein may be better understood by referring to the following description in conjunction with the accompanying drawings, in which.

Figure 1:
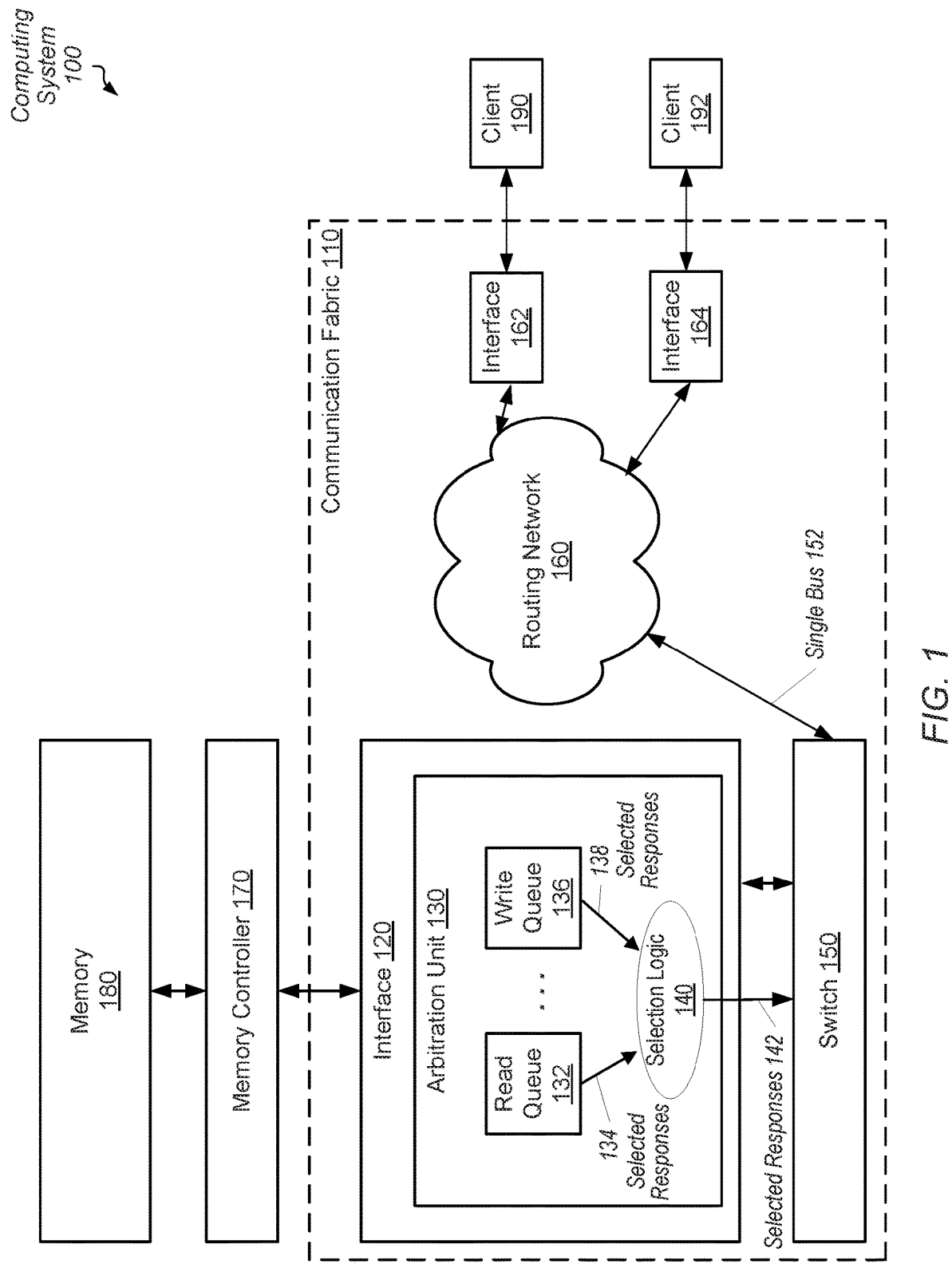
FIG. 1 is a block diagram of one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for routing traffic between clients and system memory are disclosed. In various embodiments, a computing system includes multiple clients, each capable of generating memory access operations. Examples of clients are central processing units (CPUs), graphics processing units (GPUs), other processor types, input/output (I/O) peripheral devices and so forth. In an embodiment, the system memory includes multiple vertically stacked memory dies. Each of the memory dies uses multiple memory array banks for storing data. In one embodiment, one or more memory chips are used for the system memory and use relatively wide communication lanes along with the stacked configuration. In other embodiments, other types of dynamic random access memories (DRAMs) are used. In various embodiments, the DRAM is further connected to lower levels of a memory hierarchy, such as a disk memory and offline archive memory.

In some embodiments, one or more direct memory access (DMA) engines are used to relay the memory access operations and corresponding responses between one or more clients and the system memory. In various embodiments, a communication fabric is used to provide connectivity between multiple clients as well as connectivity across sockets, if multiple sockets are used in the computing system. The communication fabric transmits traffic back and forth between the clients and the system memory via one or more memory controllers. The communication fabric follows one or more communication and network protocols. The communication fabric may also be referred to as a data fabric.

In some embodiments, the communication fabric utilizes one or more master units for interfacing with the one or more clients as well as one or more slave units for interfacing with one or more memory controllers. A client sends a generated memory write request to system memory through the master unit. In an embodiment, the master unit determines whether the received write request has a same target as one or more other received write requests. In an embodiment, the target is a same memory controller of multiple memory controllers. If so, the received write request is included in the group of other write requests with the same target if other conditions are satisfied. In an embodiment, the other conditions include a window of time for forming the group has not yet expired and a size of the group does not exceed a size threshold.

In one embodiment, if one of the multiple conditions is not satisfied, a second group is started and the received write request is the first request in the new group. In one embodiment, a command bit is added in a packet when routing the write request. The command bit identifies write requests which drop corresponding acknowledgment responses. Dropping acknowledgment responses is equivalent to providing an indication specifying no acknowledgment response should be sent, thus, preventing the acknowledgment response. In an embodiment, only the youngest write request in a group maintains its corresponding acknowledgment response, so the command bit indicates no drop. In some embodiments, groups are distinguished by a group identifier and the group identifier is inserted in a packet when routing write requests. In one embodiment, a tag for the youngest write request in the group and one or more identifiers for one or more of the client and the master unit are used as the group identifier.

In some embodiments, transferred packets for the write requests include the group identifier and a count of a number of write requests in the group. In other embodiments, transferred packets for the write requests include a group identifier and a sequence of identifiers identifying other write requests in the group and the order of the write requests. Therefore, even when the write requests in the group are processed out of order, there is sufficient information to determine when each write request in the group has been serviced.

In various embodiments, a slave unit is identified which interfaces directly with the memory controller for controlling access to the targeted memory. Control logic in the master unit determines when the write request is transferred via the communication fabric to the identified slave unit. The identified slave unit sends a received write request to the memory controller to be serviced. Subsequently, the slave unit receives a write response from the memory controller indicating memory has completed servicing the write request. The slave unit determines whether the received write response is associated with a group of write requests. If so, the slave unit determines which group includes the serviced write request and further determines whether each write request in the group has been serviced. If each write request in the group has been serviced, the slave unit generates a single write response indicating all writes in the group have been serviced.

In some embodiments, the slave unit sends the generated single write response for the group to the master unit via the communication fabric at the time the write response is generated. In other embodiments, the slave unit stores the generated single write response for the group in a write response queue prior to sending the write response to the master unit. In an embodiment, the slave unit includes arbitration logic for selecting particular write responses of multiple outstanding write responses to send to a corresponding master unit. In various embodiments, the selection of a write response may be performed in order or out of order according to any of a variety of selection algorithms. In various embodiments, the slave unit also receives one or more read responses from the memory controller indicating memory completed servicing one or more read requests. The read responses include data. Therefore, the read responses typically consume more bandwidth than write responses. In some embodiments, the slave unit stores the received read responses with data in a queue. In one embodiment, the slave unit includes arbitration logic for selecting particular responses among the outstanding read responses and the outstanding write responses. The slave unit uses any of a variety of arbitration selection techniques to select responses to send at a given time. The slave unit sends the selected responses to corresponding master units via the communication fabric.

In various embodiments, the computing system attempts to maintain a particular data bandwidth while also lowering power consumption. The reduction in write responses reduces the number of times a write response is chosen to be sent on the communication fabric over a read response. In addition, a single write response for a group of write requests being sent on the communication fabric reduces power consumption. Responsive to receiving the single write response for the group of multiple write requests, the master unit sends a respective acknowledgment response for each of the multiple write requests in the group to clients that generated the multiple write requests.

Turning now to FIG. 1, a generalized block diagram of one embodiment of a computing system 100 is shown. The computing system 100 includes communication fabric 110 between memory controller 170 and clients 190 and 192. As used herein, communication fabric 110 is also referred to as data fabric 110 or simply fabric 110. Memory controller 170 is used for interfacing with memory 180. Interface 120 within fabric 110 is used for transferring at least data, requests and acknowledgment responses between memory controller 170 and fabric 110. Interfaces 162 and 164 are used for transferring at least data, requests and acknowledgment responses between fabric 110 and clients 190 and 192, respectively. In some embodiments, each one of interfaces 162 and 164 communicates with a single client as shown. In other embodiments, one or more of interfaces 162 and 164 communicates with multiple clients and tracks traffic with a client identifier.

Each of the clients 190 and 192 is capable of generating memory access requests for data stored in the memory 180. Although two clients are shown, computing system 100 may include any number of clients. In various embodiments, each of the clients 190 and 192 is a functional block or unit, a processor core or a processor. For example, in an embodiment, the computing system 100 includes a general-purpose central processing unit (CPU), a highly parallel data architecture processor such as a graphics processing unit (GPU), a display unit, a multimedia unit, and one or more input/output (I/O) peripheral devices, and one or more is a client within computing system 100. In some embodiments, one or more hubs are used for interfacing to a multimedia player, a display unit and other. In such cases, the hubs are clients in computing system 100. Each hub additionally includes control logic and storage elements for handling traffic according to appropriate protocols.

In some embodiments, clients 190 and 192 are individual dies on an integrated circuit (IC), such as a system-on-a-chip (SOC). In other embodiments, clients 190 and 192 are individual dies in a system-in-package (SiP) or a multi-chip module (MCM). In yet other embodiments, clients 190 and 192 are individual dies or chips on a printed circuit board. In various embodiments, clients 190 and 192 are used in a smartphone, a tablet computer, a gaming console, a smartwatch, a desktop computer and so forth.

In various embodiments, fabric 110 transfers traffic back and forth between clients 190 and 192 and between memory 180 and clients 190 and 192. Although a single memory controller 170 is shown, in other embodiments, computing system 100 includes multiple memory controllers, each supporting one or more memory channels. Interfaces 162 and 164 support communication protocols with clients 190 and 192, respectively. In some embodiments, interfaces 162 and 164 include at least queues for storing requests and responses, selection logic for arbitrating between received requests before sending requests to network 160 and logic for building packets, decoding packets and supporting a communication protocol with the network 160. In an embodiment, interfaces 162, 164 and 120 have updated mappings between address spaces and memory channels. In various embodiments, interfaces 120, 162 and 164 and memory controller 170 include hardware circuitry and/or software for implementing algorithms to provide its desired functionality.

As used herein, the term "access" refers to performing a read access request or a write access request of data corresponding to a specified memory address. As used herein, a "block" retrieved, used and modified by clients 190 and 192 is a set of bytes stored in contiguous memory locations, which are treated as a unit for coherency purposes. As used herein, each of the terms "cache block", "block", "cache line", and "line" is interchangeable. In some embodiments, a block is the unit of allocation and deallocation in a cache. One of a variety of a number of bytes is used for the block size and the number is selected according to design choice. In addition, each of the terms "cache tag", "cache line tag", and "cache block tag" is interchangeable.

In various embodiments, an up-to-date (most recent) copy of data is brought from the memory 180 into one or more levels of a cache memory subsystem of one of the clients 190 and 192. Based on the instructions being processed by the client, the client updates the copy of the data and now contains the up-to-date (most recent) copy of the data. Alternatively, the client does not modify the data retrieved from memory 180, but uses it to process instructions of one or more applications and update other data. At a later time, the client fills its cache memory subsystem with other data as it processes instructions of other applications and evicts the particular data stored at the specified memory address. The copy of the data is returned from the corresponding one of the clients 190 and 192 to the memory 180 by a write access request to update the stored copy in the memory 180.

In various embodiments, computing system 100 includes one or more direct memory access (DMA) engines to perform memory accesses of memory 180 without intervention from one of clients 190 and 192. For example, one of the clients 190 and 192 conveys memory access operations for memory 180 to the DMA engine and returns to performing other tasks. The memory access operations include read operations, write operations, memory-to-memory copy operations, and so forth. The DMA engine performs the received memory access operations and later conveys an indication to the one of clients 190 and 192 specifying the memory access operations are completed.

In an embodiment, the DMA engine performs the memory access operations in a simple mode where the DMA engine executes the memory access operations separately. Alternatively, in another embodiment, the DMA engine performs the memory access operations in a scatter gather mode where the DMA engine executes a sequence of memory access operations stored in a set of buffers by the processor along with associated buffer descriptors. In this mode, the DMA engine gathers data from the set of buffers and writes the retrieved data to a single data stream, or the DMA engine reads data from a single data stream and scatters data into the set of buffers. The DMA engine can also be used for "memory to memory" copying or moving of data within memory 180, which are expensive memory operations.

One or more of interfaces 162 and 164, switches in fabric 110 and interface 120 translates a target address corresponding to a requested block and sends a read request to memory 180 in a packet. In various embodiments, protocols, address formats, interface signals and synchronous/asynchronous clock domain usage, and so forth, in interfaces 162 and 164, switches in fabric 110 and interface 120 support any one of a variety of memory communication protocols and data transmission protocols.

Memory controller 170 includes queues for storing requests and responses. Additionally, memory controller 170 includes control logic for grouping requests to be sent to memory 180, sending the requests based on timing specifications of the memory 180 and supporting any burst modes. Memory controller 170 also includes status and control registers for storing control parameters. In various embodiments, each of interface 120 and memory controller 170 reorders received memory access requests for efficient out-of-order servicing. The reordering is based on one or more of a priority level, a quality of service (QoS) parameter, an age of a packet for a memory access request, and so forth.

In various embodiments, memory 180 includes row buffers for storing the contents of a row of dynamic random access memory (DRAM) being accessed. In an embodiment, an access of the memory 180 includes a first activation or an opening stage followed by a stage that copies the contents of an entire row into a corresponding row buffer. Afterward, there is a read or write column access in addition to updating related status information. In some embodiments, memory 180 includes multiple banks. Each one of the banks includes a respective row buffer. The accessed row is identified by an address, such as a DRAM page address, in the received memory access request from one of the clients 190 and 192. In various embodiments, the row buffer stores a page of data. In some embodiments, a page is 4 kilobytes (KB) of contiguous storage of data. However, other page sizes are possible and contemplated.

In an embodiment, memory 180 includes multiple three-dimensional (3D) memory dies stacked on one another. Die-stacking technology is a fabrication process that enables the physical stacking of multiple separate pieces of silicon (integrated chips) together in a same package with high-bandwidth and low-latency interconnects. In some embodiments, the die is stacked side by side on a silicon interposer, or vertically directly on top of each other. One configuration for the SiP is to stack one or more memory chips next to and/or on top of a processing unit.

In various embodiments, fabric 110 includes control logic, status and control registers and other storage elements for queuing requests and responses, storing control parameters, following one or more communication and network protocols, and efficiently routing traffic between sources and destinations on one or more buses. In an embodiment, routing network 160 utilizes multiple switches, such as switch 150, in a point-to-point (P2P) ring topology. In other embodiments, routing network 160 utilizes network switches with programmable routing tables in a cluster topology. In yet other embodiments, routing network 160 utilizes a combination of topologies.

As shown, switch 150 transfers traffic on a single bus 152 to reduce the number of wires in computing system 100. As described earlier, in some embodiments, computing system 100 includes multiple memory controllers and multiple memory channels. Therefore, multiple interfaces, such as interface 120, are included in computing system 100. Routing congestion increases with more result buses used between switch 150 and network 160. In various embodiments, single bus 152 is bidirectional. To determine what traffic to put on the single bus 152 at a given time, interface 120 includes arbitration unit 130.

The functionality of interface 120 and arbitration unit 130 is implemented by hardware circuitry and/or software. As shown, arbitration unit 130 includes read queue 132, write queue 136 and selection logic 140. Although two queues are shown, in various embodiments, arbitration unit 130 includes any number of queues for storing memory access responses. Selection logic 140 selects between selected read responses 134 and selected write responses 138 to send as selected responses 142 to a respective one of clients 190 and 192 via switch 150 and network 160. In one embodiment, arbitration unit 130 receives memory access responses from memory controller 170. In some embodiments, arbitration unit 130 stores received read responses in read queue 132 and stores received write responses in write queue 136. In other embodiments, the received read responses and received write responses are stored in a same queue. Since read responses include requested data, whereas write responses are acknowledgment responses, in various embodiments, each entry of read queue 132 is relatively larger than an entry in the write queue 136.

In some embodiments, arbitration unit 130 reorders the received memory access responses for efficient out-of-order servicing. As described earlier, reordering is based on one or more of a priority level, a quality of service (QoS) parameter, an age of a packet for a memory access request, and so forth. The reordering algorithm is used by selection logic (not shown) within or positioned next to read queue 132 and write queue 136 as well as selection logic 140.

In various embodiments, the transmitting of responses from read queue 132 and write queue 136 on single result bus 152 includes non-overlapped timing windows. In some embodiments, the selection from which one of the queues 132 and 136 to transmit responses follows a pattern where responses are selected from the read queue 132 for two or more clock cycles before responses are selected from the write queue 136. In another embodiment, a threshold for an amount of requested data needs to be reached before switching from selecting from the read queue 132 to selecting from the write queue 136. In some embodiments, the number of cycles to select from the read queue 132 are greater than the number of cycles to select from the write queue 136 since computing system 100 attempts to maintain a particular data bandwidth while also lowering power consumption. The read responses stored in read queue 132 include requested data, whereas the write responses stored in write queue 136 do not contain requested data.

In various embodiments, the number of cycles for transmitting responses to the single response bus 152 changes during each switch between the read queue 132 and write queue 136 or after each of the two queues 132 and 136 have been selected. The pattern, the number of cycles for selecting responses before switching, the amount of requested data transmitted before switching selection, and so on, can each vary and be any value deemed efficient for the technology used to implement fabric 110 and the particular data bandwidth requirement.

Knowledge of the organization and timing specifications used for fabric 110 is known to the arbitration unit 130, which changes the selection between read queue 132 and write queue 136 based on this knowledge. As the technology and schemes change for fabric 110, the selection and reordering by the arbitration unit 130 also changes to reduce penalties and increase efficiency. In various embodiments, the arbitration unit 130 includes programmable control registers and/or control logic to adapt algorithms used for selection and reordering of responses based on the characteristics of fabric 110.

In various embodiments, one or more of interfaces 162 and 164 determines when received memory write requests target memory locations within a same address range of memory 180. The same address range of memory corresponds to a same memory channel, a same memory controller, a subset of an address range supported by the memory channel, or otherwise. One or more of interfaces 162 and 164 includes the write requests in a group. In an embodiment, other conditions to satisfy for growing the group include a window of time for forming the group has not yet expired and a size of the group does not exceed a size threshold.

In an embodiment, one or more of interfaces 162 and 164 counts a number of clock cycles since receiving a first write request. If a second write request has a same target as the first write request and the second write request is received within N clock cycles of the first write request being received, wherein N is a positive non-zero integer, then the second write request is grouped with the first write request. Based on design choice, the count may increment from a first value, such as zero, to N or the count may decrement from N to zero. In one embodiment, when the second write request is grouped with the first write request, the count resets and begins incrementing or decrementing again. Adding more write requests to the group continues in this manner with the count being reset each time a new write request is added to the group. Building the group continues until the count finishes with no new write requests or the number of write requests in the group reaches a size threshold. In another embodiment, the count does not reset when a new write request is added to the group. Rather, a larger value for N is selected upfront. When the count terminates or the group size reaches a size threshold, building the current group ends. If a write request is received with the same target, but building the current group has ended, then a new group is started although the target is the same.

In an embodiment, a command bit is added in a packet when routing the write request. The command bit identifies write requests which prevent corresponding acknowledgment responses being sent. In one embodiment, only the youngest write request in a group maintains its corresponding acknowledgment response, so the command bit indicates no drop. In some embodiments, groups are distinguished by a group identifier and the group identifier is inserted in a packet when routing write requests. In one embodiment, information used to form the group identifier includes a tag for the youngest write request in the group and one or more identifiers for the corresponding one of the clients 190 and 192 and the corresponding one of the interfaces 162 and 164.

In some embodiments, packets for the write requests transferred through fabric 110 include the group identifier and a count of a number of write requests in the group. In other embodiments, the packets for the write requests include a group identifier and a sequence of identifiers identifying other write requests in the group and the order of the write requests. Therefore, even when the write requests in the group are processed out of order by interface 120 and memory controller 170, there is sufficient information to determine when each write request in the group has been serviced.

In yet other embodiments, interfaces 162 and 164 send packets for a group in-order and interface 120 detects a new group by determining a received packet includes a command bit identifying a write request which prevents a corresponding acknowledgment response from being sent. Interface 120 stores the received packets of the group in-order and detects the end of the group when the packet of the youngest write request is received with the command bit specifying an acknowledgment response should be sent. Interface 120 transmits the write requests in-order to memory controller 170 for servicing. When an acknowledgment response for the youngest write request is sent from memory controller 170 to interface 120, interface 120 generates a single write response indicating each client generating a write request of the multiple write requests in the group receives an acknowledgment response. Interface 120 sends the single write response for the group to the corresponding one of interfaces 162 and 164. Responsive to receiving the single write response for the group of multiple write requests, the corresponding one of interfaces 162 and 164 sends a respective acknowledgment response for each of the multiple write requests in the group to a corresponding one of clients 162 and 164 that generated the multiple write requests.

Figure 2:
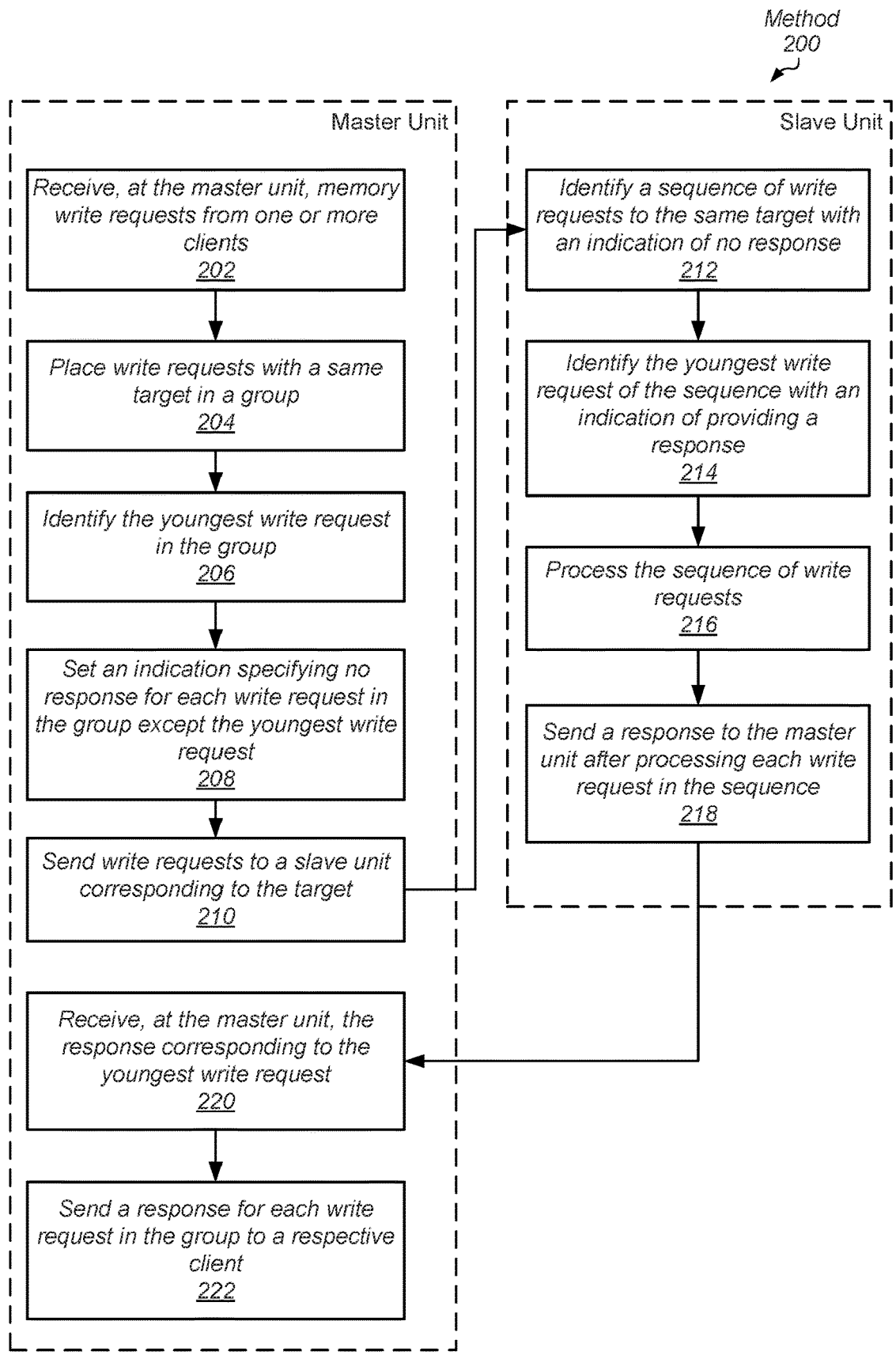
FIG. 2 is a flow diagram of one embodiment of a method for processing a memory request in a computing system with reduced response bandwidth.

Referring now to FIG. 2, one embodiment of a method 200 for processing a memory request in a computing system with reduced response bandwidth is shown. For purposes of discussion, the steps in this embodiment (as well as in FIGS. 4-6) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 200.

In various embodiments, a communication fabric transfers traffic between one or more clients and one or more memory controllers. In some embodiments, the fabric includes one or more master units, each for interfacing with a given client. Additionally, the fabric includes one or more slave units, each for interfacing with a given memory controller. In various embodiments, each master unit incorporates the functionality of interfaces 162 and 164 (of FIG. 1) and each slave unit incorporates the functionality of interface 120 (of FIG. 1). A master unit receives memory write requests from one or more clients (block 202) and places write requests with a same target in a group (block 204).

In some embodiments, the master unit identifies the youngest write request in the group (block 206) and sets an indication specifying no response for each write request in the group except the youngest write request (block 208). In an embodiment, the master unit utilizes arbitration logic for selecting memory access requests to send to the communication fabric. The master unit sends write requests to a slave unit corresponding to the target via the communication fabric (block 210). The slave unit identifies a sequence of write requests to the same target with an indication of no response (block 212). In addition, the slave unit identifies the youngest write request of the sequence with an indication of providing an acknowledgment response (block 214).

In an embodiment, the master unit inserts a command bit in a packet that identifies write requests which prevent corresponding acknowledgment responses from being sent. In one embodiment, only the youngest write request in a group maintains its corresponding acknowledgment response, so the command bit indicates an acknowledgment response should be sent. The slave unit identifies packets in a group with write requests from a same source identifying a same target and only one packet indicating an acknowledgment response should be sent.

The slave unit processes the sequence (group) of received write requests (block 214). In one embodiment, the slave unit sends the write requests in-order to a corresponding memory controller. In another embodiment, the slave unit sends the write requests out-of-order. When the write requests are serviced by memory, in an embodiment, the memory controller sends an acknowledgment response for each write request in the sequence (group) to the slave unit. When the slave unit determines each write request in the group is serviced, the slave unit generates a single write response indicating each client generating a write request of the multiple write requests receives an acknowledgment response.

The slave unit stores the single acknowledgment write response in a queue to be sent to the master unit. In various embodiments, the slave unit includes arbitration logic for selecting between write responses and read responses. When the single acknowledgment write response is selected, the slave unit sends it to the master unit (block 218). The master unit receives the single acknowledgment write response from the communication fabric (block 220). Responsive to receiving the single write response for the group of multiple write requests, the master unit sends a respective acknowledgment response for each of the multiple write requests in the group to a corresponding client (block 222).

Figure 3:
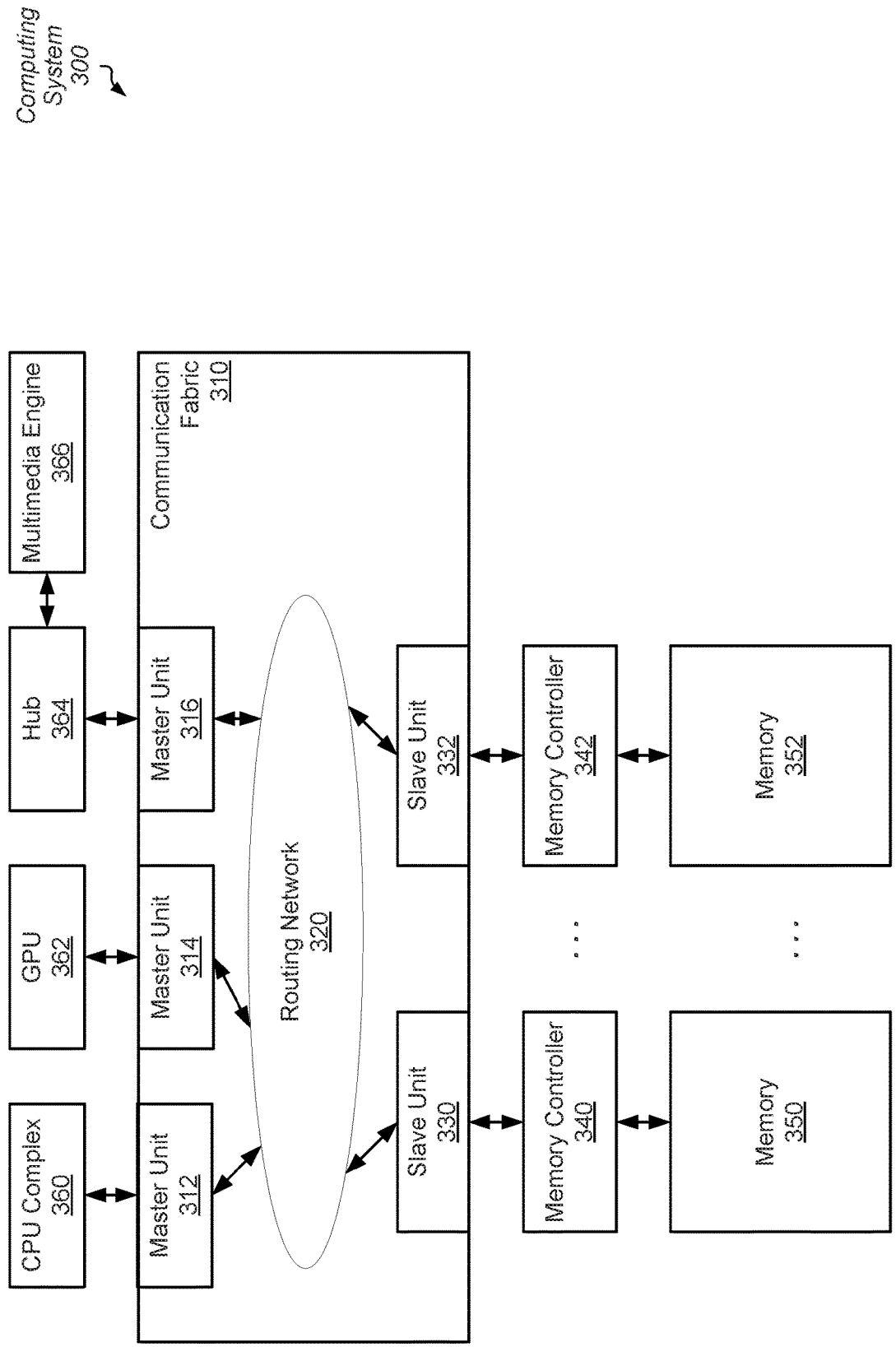
FIG. 3 is a block diagram of another embodiment of a computing system.

Turning now to FIG. 3, a generalized block diagram of another embodiment of a computing system 300 is shown. The computing system 300 includes communication fabric 310 between each of memory controllers 340 and 342 and clients such as CPU 360, GPU 362 and Hub 364. Hub 364 is used for communicating with Multimedia Engine 366. In some embodiments, the components of computing system 300 are individual dies on an integrated circuit (IC), such as a system-on-a-chip (SOC). In other embodiments, the components are individual dies in a system-in-package (SiP) or a multi-chip module (MCM). The CPU 360, GPU 362 and Multimedia Player 366 are examples of clients capable of generating memory access requests. Memory controllers 340 and 342 are used for interfacing with memories 350 and 352.

Similar to memory 180 (of FIG. 1), memories 350 and 352 use any variety of DRAM implementations. Similarly, in various embodiments, fabric 310 incorporates the functionality of fabric 110 (of FIG. 1), each of master units 312-316 incorporates the functionality of interfaces 162-164 (of FIG. 1) and each of slave units 330-332 incorporates the functionality of interface 120 (of FIG. 1). In an embodiment, routing network 320 utilizes multiple switches in a point-to-point (P2P) ring topology. In other embodiments, routing network 320 utilizes network switches with programmable routing tables in a mesh topology. In yet other embodiments, routing network 320 utilizes a combination of topologies. In various embodiments, routing network 320 includes one or more single buses to reduce the number of wires in computing system 300. For example, one or more of slave units 330-332 sends read responses and write responses on a single bus within routing network 320. In order to increase efficiency with routing traffic, the number of write responses is reduced. For example, the master units 312-316 and the slave units 330-332 perform steps to reduce a number of acknowledgment write responses for a group of write requests to a single response.

Figure 4:
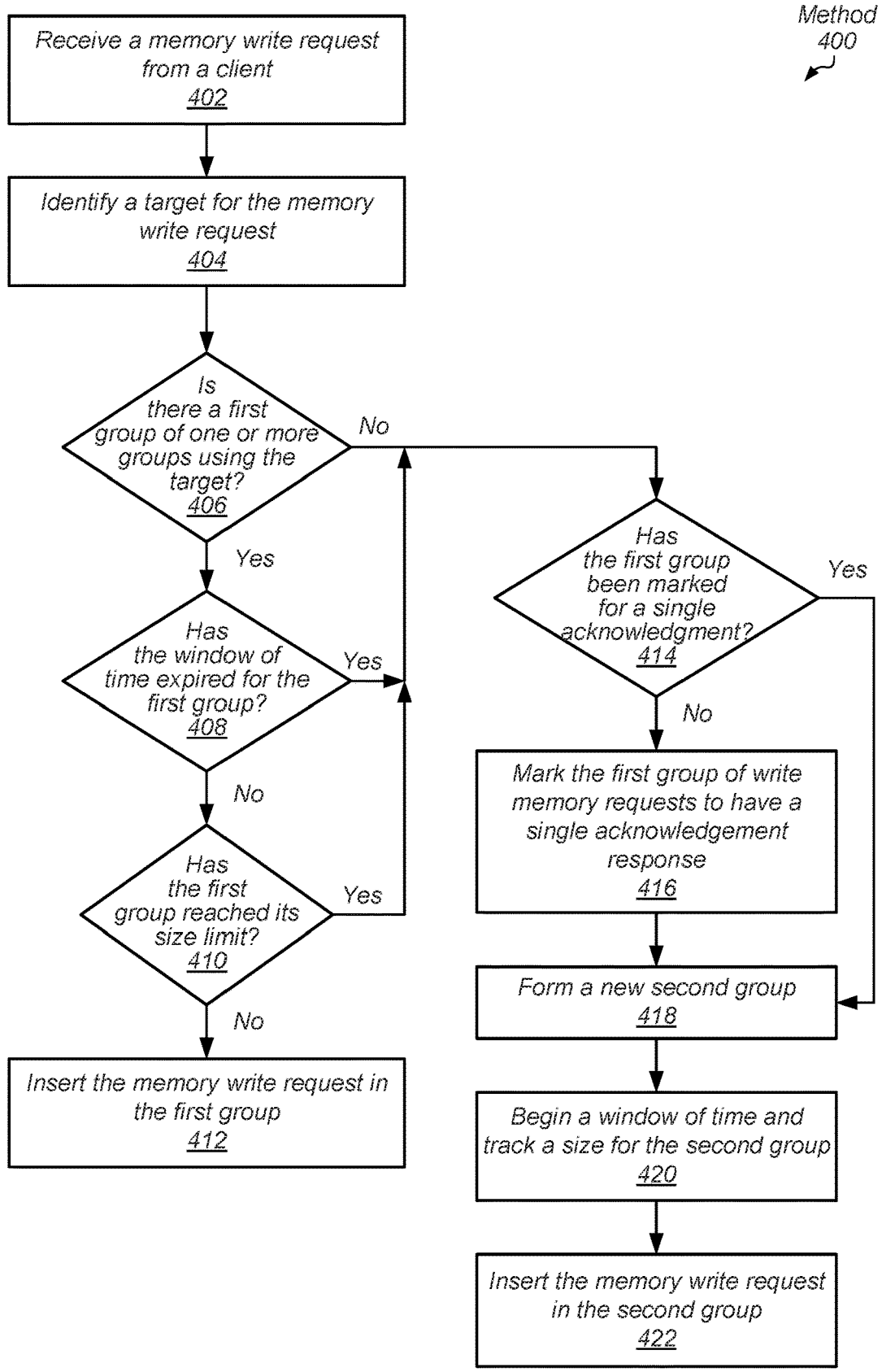
FIG. 4 is a flow diagram of one embodiment of a method for forming groups of memory write requests to reduce response bandwidth.

Turning now to FIG. 4, one embodiment of a method 400 for forming groups of memory write requests to reduce response bandwidth is shown. A master unit within a communication fabric receives a memory write request from a client (block 402). The master unit identifies a target for the memory write request (block 404). In an embodiment, the target is a particular memory channel of multiple memory channels in the computing system. The target address is used to identify the particular memory channel. If a first group of one or more groups of memory write requests uses the target ("yes" branch of the conditional block 406), then one or more other conditions need to be satisfied before inserting the received write request in the first group. If the window of time has not expired for the first group ("no" branch of the conditional block 408) and if the first group has not reached its size limit ("no" branch of the conditional block 410), then the master unit inserts the received memory write request in the first group (block 412).

If either the window of time has expired for the first group ("yes" branch of the conditional block 408) or if the first group has reached its size limit ("yes" branch of the conditional block 410), then the first group is checked to verify whether the first group has been marked for a single acknowledgment response for the multiple write requests. Similarly, if no group of one or more groups of memory write requests uses the target ("no" branch of the conditional block 406), then the first group is checked. If the first group has not been marked for a single acknowledgment response ("no" branch of the conditional block 414), then the first group of write memory requests is marked to have a single acknowledgement response (block 416).

As described earlier, the marking includes inserting into packets one or more of a command bit indicating whether to drop an acknowledgment response for the particular write request, a group identifier, a number of the write requests in the group, a sequence of in-order request identifiers for the write requests in the group, and so forth. In various embodiments, the master unit monitors the window of time and the group size for each outstanding group and when thresholds are reached, the master unit marks the corresponding group to have a single acknowledgement response. Afterward control flow of method 400 moves to block 418 where the slave unit forms a new second group. Similarly, if the first group has already been marked for a single acknowledgment response ("yes" branch of the conditional block 414), then control flow of method 400 moves to block 418. The master unit begins a window of time and tracks a size for the second group (block 420). The master unit also inserts the memory write request in the second group (block 422).

Figure 5:
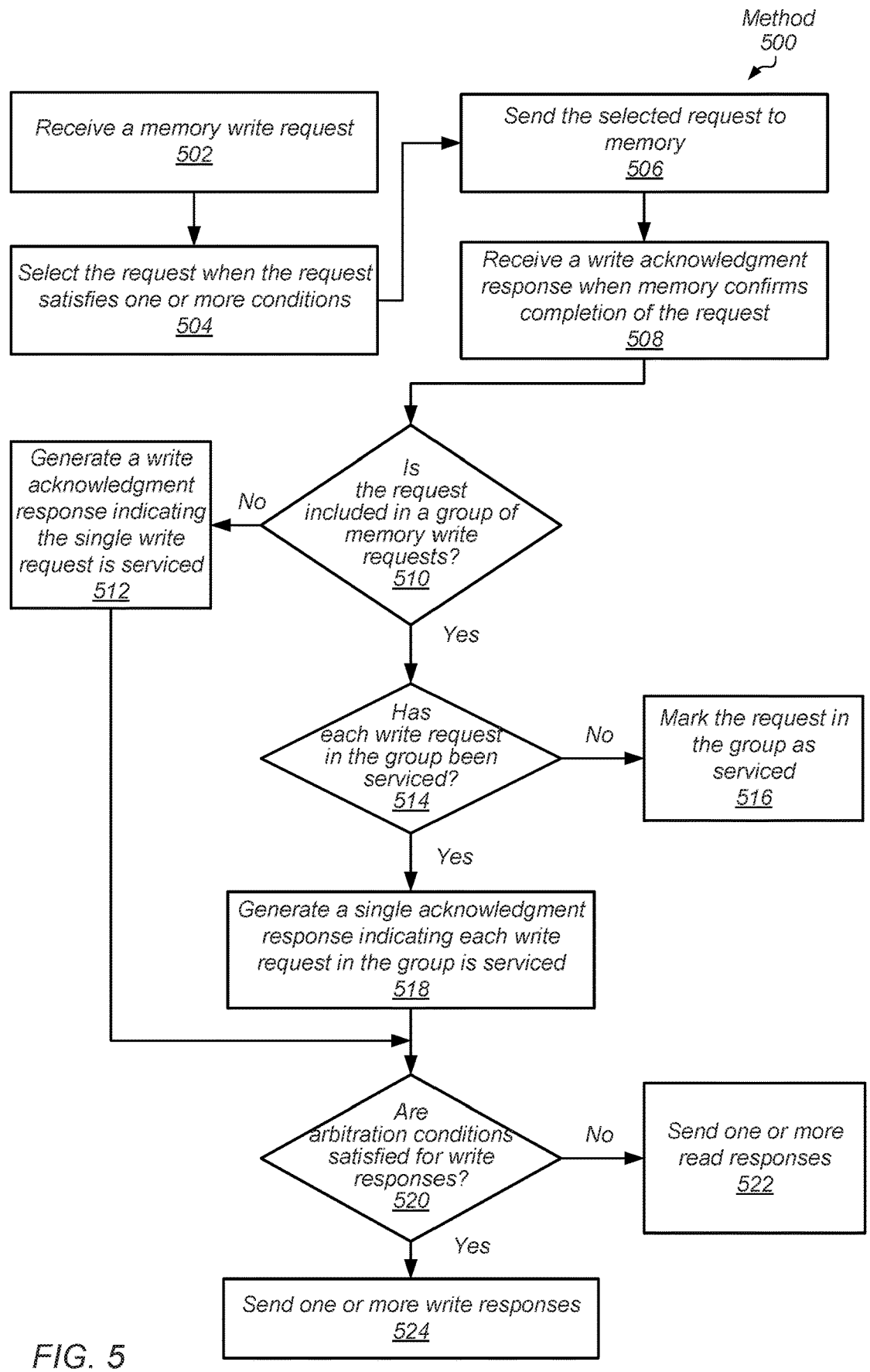
FIG. 5 is a flow diagram illustrating another embodiment of a method for processing groups of memory write requests to reduce response bandwidth.

Turning now to FIG. 5, one embodiment of a method 500 for processing groups of memory write requests to reduce response bandwidth is shown. A memory write request is received by a slave unit from a communication fabric (block 502). In some embodiments, the slave unit identifies whether the received write request is included in a group of multiple write requests. In other embodiments, the slave unit checks whether the write request is included in a group after the write request is serviced. The slave unit selects the write request when the write request satisfies one or more conditions (block 504). In an embodiment, the slave unit includes arbitration logic for selecting among received read requests and received write requests to send to a memory controller. In various embodiments, the selection is based on one or more of a priority level, a quality of service (QoS) parameter, an age of a packet for the memory access request, and so forth.

The slave unit sends the selected write request to memory via the memory controller (block 506). The slave unit receives a write response when memory confirms completion of the write request (block 508). The slave unit inspects the write requests either upon receiving them or after servicing to determine whether the write request is included in a group of write requests. As described earlier, in various embodiments, write requests are marked with one or more of a command bit indicating whether to drop an acknowledgment response for the particular write request, a group identifier, a number of the write requests in the group, a sequence of in-order request identifiers for the write requests in the group, and so forth.

If the serviced write request is not included in a group of memory write requests ("no" branch of the conditional block 510), then the slave unit generates a write response indicating the single write request is serviced (block 512). Afterward, control flow of method 500 moves to conditional block 520. If the serviced write request is included in a group of memory write requests ("yes" branch of the conditional block 510), and not every write request in the group has yet been serviced ("no" branch of the conditional block 514), then the slave unit marks the request in the group as serviced (block 516).

If each write request in the group has been serviced ("yes" branch of the conditional block 514), then the slave unit generates a single acknowledgment response indicating each write request in the group is serviced (block 518). If the slave unit determines arbitration conditions are not satisfied for write responses ("no" branch of the conditional block 520), then the slave unit sends one or more read responses (block 522). However, if the slave unit determines arbitration conditions are satisfied for write responses ("yes" branch of the conditional block 520), then the slave unit sends one or more write responses (block 524). As described earlier, the arbitration conditions include one or more of a priority level, a quality of service (QoS) parameter, an age of a packet for the memory access request, a first number of cycles to select read responses, a second number of cycles to select write responses, a pattern for alternating between the first number and the second number, an amount of data bandwidth sent from the slave unit to the communication fabric, and so forth.

Figure 6:
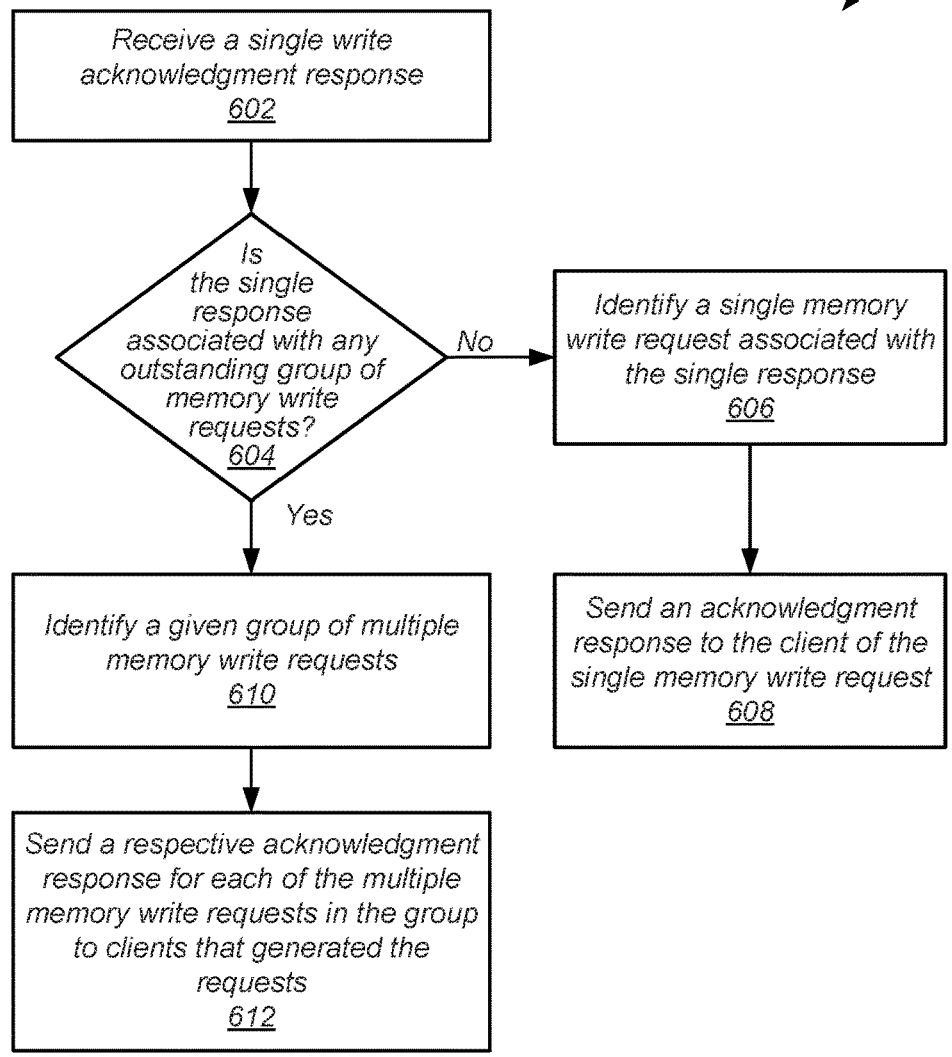
FIG. 6 is a flow diagram of one embodiment of a method for processing write responses in a computing system with reduced response bandwidth.

Turning now to FIG. 6, one embodiment of a method 600 for processing write responses in a computing system with reduced response bandwidth is shown. A master unit in a communication fabric receives a single write response (block 602). If the single acknowledgment response is not associated with any outstanding group of memory write requests ("no" branch of the conditional block 604), then the master unit identifies a single memory write request associated with the single response (block 606). For example, the master unit parses and decodes the received response to find identifiers specifying the client and locates one or more queue entries allocated for storing information corresponding to the write request. The master unit sends an acknowledgment response to the client of the single memory write request (block 608). In addition, the master unit frees any queue entries storing information corresponding to the write request.

If the single acknowledgment response is associated with any outstanding group of memory write requests ("yes" branch of the conditional block 604), then the master unit identifies a given group of multiple memory write requests (block 610). The master unit sends a respective acknowledgment response for each of the multiple memory write requests in the group to clients that generated the requests (block 612). Therefore, a single write response received from the communication fabric is used to generate multiple acknowledgment responses, one for each write request in the identified group. In addition, the master unit frees any queue entries storing information corresponding to the multiple write requests in the identified group.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A computing system, comprising:
one or more clients configured to generate memory write requests;
a slave unit; and
a memory controller configured to interface with a memory;
wherein the slave unit is configured to:
receive a plurality of memory write requests generated by the one or more clients;
determine the received memory write requests have both a same target and a same group identifier, wherein each of the memory write requests except a youngest memory write request of the received plurality of memory write requests generated by the one or more clients includes an indication within the respective write request that a corresponding write response is not to be sent from the slave unit;
send the memory write requests to the memory controller to be serviced; and
in response to determining that each memory write request of the memory write requests has been serviced, generate a write response for only the youngest memory write request of the received plurality of memory write requests generated by the one or more clients.

2. The computing system as recited in claim 1, wherein the same group identifier identifies one or more clients and distinguishes from other groups with a separate group identifier identifying one or more clients.

3. The computing system as recited in claim 1, wherein each write request of the memory write requests comprises a tag identifying a youngest write request of the memory write requests, and wherein the youngest write request does not include said indication.

4. The computing system as recited in claim 1, wherein each write request of the memory write requests comprises a count of a number of write requests of the memory write requests.

5. The computing system as recited in claim 1, wherein the system further comprises a master unit configured to:
receive the plurality of memory write requests generated by the one or more clients;
store a first group identifier in a received first memory write request of the plurality of memory write requests identifying a first group, in response to determining the first memory write request is one of multiple received memory write requests of the plurality of memory write requests having a same target;
store in each memory write request in the first group, except one, an indication that a corresponding write response is not to be sent from the slave unit; and
send each memory write request in the first group to the slave unit, in response to determining the memory controller controls access to the target; and
receive write responses from the slave unit.

6. The computing system as recited in claim 5, wherein the master unit is configured to send a separate write response for each of the plurality of memory write requests of the first group to clients of the one or more clients that generated the plurality of memory write requests of the first group, in response to:
receiving a write response; and
determining the write response includes the first group identifier, wherein the first group identifier indicates each of the plurality of memory write requests of the first group has been serviced.

7. The computing system as recited in claim 5, wherein in response to receiving a second memory write request that has the target of the first group and determining a window of time for forming the first group has expired, the master unit is configured to store a second group identifier in the received second memory write request that identifies a second group different than the first group.

8. The computing system as recited in claim 5, wherein in response to receiving a second memory write request that has the target of the first group and determining a size of the first group has reached a threshold, the master unit is further configured to store a second group identifier in the received second memory write request that identifies a second group different than the first group.

9. A method, comprising:
receiving, by a slave unit in a data fabric, a plurality of memory write requests generated by one or more clients;

determining the received memory write requests have both a same target and a same group identifier, wherein each of the memory write requests except a youngest write request of the received plurality of memory write requests generated by the one or more clients includes an indication within the respective write request that a corresponding write response is not to be sent from the slave unit;

sending the memory write requests to a memory controller to be serviced; and in response to determining that each memory write request of the memory write requests has been serviced, generating a write response for only the youngest memory write request of the received plurality of memory write requests generated by the one or more clients.

10. The method as recited in claim 9, wherein the same group identifier identifies one or more clients and distinguishes from other groups with a separate group identifier identifying one or more clients.

11. The method as recited in claim 9, further comprising storing, by a master unit in a data fabric, a tag in each write request of the memory write requests, wherein the tag identifies a youngest write request of the memory write requests, and wherein the youngest write request is the only write request that does not store said indication.

12. The method as recited in claim 9, further comprising storing, by a master unit in a data fabric, a count in each write request of the memory write requests, wherein the count is a number of write requests of the memory write requests.

13. The method as recited in claim 9, further comprising:
storing, by a master unit in a data fabric, a first group identifier that indicates a received first memory write request of the plurality of memory write requests is associated with a first group, in response to determining the first memory write request is one of multiple received memory write requests of the plurality of memory write requests having a same target;
storing in each memory write request in the first group, except one, an indication that a corresponding write response is not to be sent from the slave unit; and
sending each memory write request in the first group to the slave unit, in response to determining that the memory controller controls access to the target; and
receiving write responses from the slave unit.

14. The method as recited in claim 13, further comprising sending a separate write response for each of the plurality of memory write requests of the first group to clients of the one or more clients that generated the plurality of memory write requests of the first group, in response to:
receiving a write response; and
determining the write response includes the first group identifier, wherein the first group identifier indicates each of the plurality of memory write requests of the first group has been serviced.

15. The method as recited in claim 13, wherein in response to receiving a second memory write request that has the target of the first group and determining a window of time for forming the first group has expired, the method further comprises storing, by the master unit, a second group identifier in the received second memory write request that identifies a second group different than the first group.

16. The method as recited in claim 13, wherein in response to receiving a second memory write request that has the target of the first group and determining a size of the first group has reached a threshold, the method further comprises storing, by the master unit, a second group identifier in the received second memory write request that identifies a second group different than the first group.

17. A communication fabric, comprising:
control logic comprising at least a slave unit configured to:
receive, via a first interface, a plurality of memory write requests generated by one or more clients;
determine the received memory write requests have both a same target and a same group identifier, wherein each of the memory write requests except a youngest write request of the received plurality of memory write requests generated by the one or more clients includes an indication within the respective write request that a corresponding write response is not to be sent from the slave unit;
send the memory write requests via a second interface to a memory controller to be serviced; and
in response to determining that each memory write request of the memory write requests has been serviced, generate a write response for only the youngest memory write request of the received plurality of memory write requests generated by the one or more clients.

18. The communication fabric as recited in claim 17, wherein the control logic further comprises a master unit configured to:
receive memory write requests generated by one or more clients;
store a first group identifier that indicates a received first memory write request of the plurality of memory write requests is associated with a first group, in response to determining the first memory write request is one of multiple received memory write requests of the plurality of memory write requests having a same target;
store in each memory write request in the first group except one an indication that a corresponding write response is not to be sent from the slave unit; and
send each memory write request in the first group to the slave unit, in response to determining the memory controller controls access to the target; and
receive write responses from the slave unit.

19. The communication fabric as recited in claim 17, wherein each write request of the memory write requests comprises a count of a number of write requests of the memory write requests.

20. The communication fabric as recited in claim 18, wherein in response to receiving the single write response, the master unit is configured to send a separate write response for each of the plurality of memory write requests of the memory write requests to clients of the one or more clients that generated the plurality of memory write requests of the memory write requests.

* * * * *